United States Patent
Dunbar et al.

(10) Patent No.: US 10,822,945 B1
(45) Date of Patent: Nov. 3, 2020

(54) STORING DATA BASED ON A VALUE ASSOCIATED WITH AN AMBIENT CONDITION DOWNHOLE IN A BOREHOLE OF A GEOLOGIC FORMATION

(71) Applicant: Halliburton Energy Services, Inc., Houston, TX (US)

(72) Inventors: Bradley David Dunbar, The Woodlands, TX (US); Robert W Arfele, Montgomery, TX (US); Douglas Bruce Caraway, Conroe, TX (US); John Leslie Wisinger, Jr., Spring, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 16/433,004

(22) Filed: Jun. 6, 2019

(51) Int. Cl.
  *E21B 47/26* (2012.01)
  *E21B 41/00* (2006.01)
  *E21B 47/07* (2012.01)

(52) U.S. Cl.
  CPC .............. *E21B 47/26* (2020.05); *E21B 41/00* (2013.01); *E21B 47/07* (2020.05)

(58) Field of Classification Search
  None
  See application file for complete search history.

(56) References Cited

U.S. PATENT DOCUMENTS

| | | | | |
|---|---|---|---|---|
| 2003/0081942 | A1* | 5/2003 | Melnyk | G07C 5/0891 386/227 |
| 2016/0078907 | A1* | 3/2016 | Woo | G06F 3/0619 711/162 |
| 2017/0045930 | A1* | 2/2017 | Robson | G06F 11/00 |
| 2020/0105349 | A1* | 4/2020 | Kang | G11C 7/04 |

* cited by examiner

*Primary Examiner* — Curtis A Kuntz
*Assistant Examiner* — Jerold B Murphy
(74) *Attorney, Agent, or Firm* — Gilliam IP PLLC

(57) ABSTRACT

Data is stored in a first storage device or second storage device, where the first storage device and second storage device are located in a borehole of a geologic formation, and where a value of a storage attribute associated with the first storage device is different than a value of a storage attribute associated with the second storage device. A value based on an ambient condition downhole in the borehole is determined. The data is stored in the first storage device, if the value based on the ambient condition is less than or equal to a threshold or the data is stored in the second storage device, if the value based on the ambient condition is greater than the threshold.

20 Claims, 11 Drawing Sheets

STORING DATA BASED ON A VALUE ASSOCIATED WITH AN AMBIENT CONDITION DOWNHOLE IN A BOREHOLE OF A GEOLOGIC FORMATION

FIELD OF USE

The disclosure generally relates to the field of data storage, and more particularly to storing data based on a determination of a value of an ambient condition downhole in a borehole of a geologic formation.

BACKGROUND

Sensors associated with a drill for drilling a borehole in a geologic formation, and sensors associated with a wireline tool lowered in the borehole of the geologic formation collect data downhole. The data includes formation properties such as resistivity and conductivity of the geologic formation. The data is stored in a storage system also located downhole for later analysis. The storage system is subject to varying ambient conditions, including varying temperatures and varying vibration levels. These ambient conditions produce challenges in reliably storing the data in the storage system.

Figure 1:
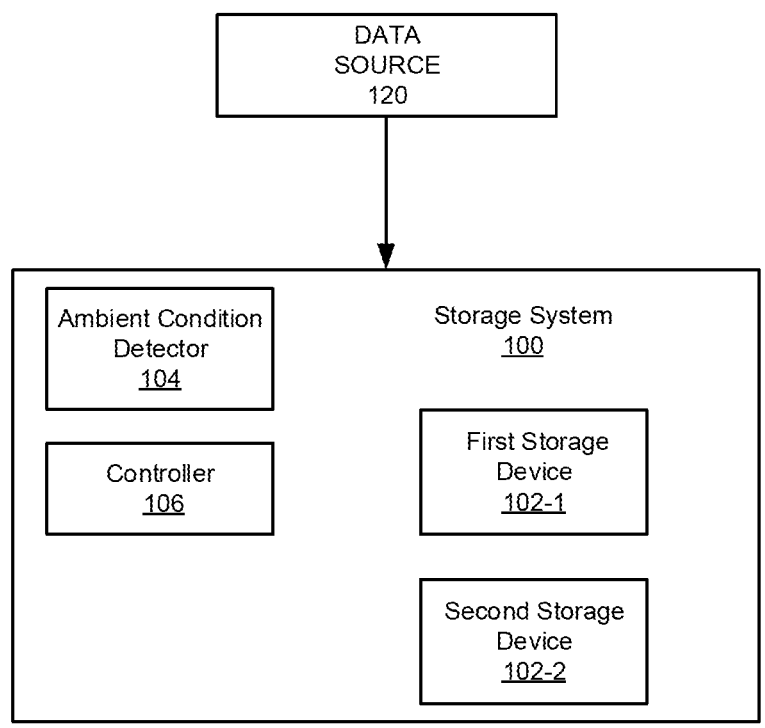
FIG. 1 is a block diagram of an example storage system which stores data in a storage device based on a value of an ambient condition downhole in a borehole of a geologic formation.

The drawings are for the purpose of illustrating example embodiments, but it is understood that the embodiments are not limited to the arrangements and instrumentality shown in the drawings.

DESCRIPTION

The description that follows includes example systems, methods, techniques, and program flows that embody aspects of the disclosure. However, it is understood that this disclosure may be practiced without these specific details. For instance, this disclosure refers to a storage system in a borehole of a geologic formation which stores data based on a value of an ambient condition downhole in the borehole such as temperature and/or vibration level. In other instances, well-known instruction instances, protocols, structures and techniques have not been shown in detail in order not to obfuscate the description.

Overview

Embodiments described herein are directed to a storage system able to store data in a storage device based on a value associated with an ambient condition downhole in a borehole of a geologic formation. The storage system has a first storage device, a second storage device, an ambient condition detector, and a controller. The first storage device and second storage device can take the form of non-volatile memory or a disk drive. The first storage device and second storage attribute have a storage attribute, where a value of the storage attribute associated with the first storage device is different from a value of the storage attribute associated with the second storage device. In the case of non-volatile memory, the storage attribute may be one or more of a memory density of the storage device, power consumption by the storage device, and/or data transfer rate in the storage device, among other storage attributes. In the case of the disk drive, the storage attribute may be one or more of a vibration resistance, a power consumption, and/or a data transfer rate. The storage system is located in a borehole of a geologic formation. The ambient condition detector determines a value based on an ambient condition downhole in the borehole. For example, the value based on the ambient condition could be vibration level or temperature if the storage device is a disk drive and temperature if the storage device is non-volatile memory. The controller stores the data in a first storage device if the value based on the ambient condition is less than or equal to a threshold. Alternatively, the controller stores the data in a second storage device if the value based on the ambient condition is greater than the threshold.

A higher value of a storage attribute of memory density means that a non-volatile memory is more dense than if the non-volatile memory has a lower value of the storage attribute. Storage of the data in the first non-volatile memory or second non-volatile memory with different values of a storage attribute associated with memory density results in the storage system being able to store more data in a fixed amount of space than if the data is stored in a storage system with only non-volatile memory having a single lower value of memory density. If the temperature is less than or equal to threshold, then the first non-volatile memory which has the higher value of memory density stores the data. If the temperature is greater than the threshold, then the second non-volatile memory with lower value of memory density stores the data. The data is not stored in the first non-volatile memory with higher value of memory density because the data would get corrupted by the temperature. This approach results in overall efficient use of the fixed space.

A lower value of the storage attribute of power consumption means that a non-volatile memory consumes less power than if the non-volatile memory has a higher value of the storage attribute. Storage of the data in the first non-volatile memory or second non-volatile memory with different values of a storage attribute of power consumption results in the storage system being able to consume less power than if the data is stored in a storage system with only a non-volatile memory having the higher value of power consumption. If the temperature is less than or equal to threshold, then the first non-volatile memory which has the lower value of power consumption stores the data. If the temperature is greater than the threshold, then the second non-volatile memory with higher value of power consumption stores the data. The data is not stored in the first non-volatile memory with lower power consumption because the data would get corrupted by the temperature. This approach results in overall efficient use of power by the storage system.

A higher value of the storage attribute of a data transfer rate means that a non-volatile memory is able to store and/or retrieve (i.e., transfer) data faster than if the non-volatile memory has a lower value of the storage attribute. Storage of the data in the first non-volatile memory or second non-volatile memory with different values of a storage attribute of a data transfer rate results in the storage system being able to transfer data faster than if the data is stored in a storage system with only memory having a single lower value of the data transfer rate. If the temperature is less than or equal to threshold, then the first non-volatile memory which has the higher value of the data transfer rate stores the data. If the temperature is greater than the threshold, then the second non-volatile memory stores the data. The data is not stored in the first non-volatile memory with higher data transfer rate because the data would get corrupted by the temperature. This approach results in faster overall storage and/or retrieval of the data by the storage system.

A higher value of a storage attribute of vibration resistance means that data in a disk drive is able to be stored in presence of higher vibration compared to a disk drive with a lower value of the storage attribute. Vibration resistance is inversely related to storage density. In this regard, storage of the data in the first disk drive or second disk drive with different values of a storage attribute associated with vibration resistance results in the storage system being able to store more data in a fixed amount of space than if the data is stored in a storage system with only a disk drive with a single higher storage attribute of vibration resistance. If the vibration level is less than or equal to threshold, then the first disk drive which has the lower vibration resistance stores the data. If the vibration level is greater than the threshold, then the second disk drive stores the data. The data is not stored in the first disk drive with the lower vibration resistance because the data would get corrupted by the vibration level. This approach results in overall efficient use of the fixed space.

The description that follows includes example systems, apparatuses, and methods that embody aspects of the disclosure. However, it is understood that this disclosure may be practiced without these specific details. In other instances, well-known structures and techniques have not been shown in detail in order not to obfuscate the description.

Example Illustrations

FIG. 1 is a block diagram of an example storage system 100 which stores data in different storage devices based on an ambient condition downhole in a borehole of a geologic formation. The ambient condition may be characterized in many ways including temperature and/or vibration level, among other characterizations.

The storage system 100 may be part of a tool attached to a wireline lowered downhole in a borehole of a geologic formation which stores data collected by the tool such as resistivity and conductivity of the geologic formation. In another example, the storage system 100 may be part of a drilling tool which stores data collected by the drilling tool as the geologic formation is drilled, such as the resistivity and conductivity of the geologic formation. The data that is collected may be represented as a data source 120.

The storage system 100 may have a plurality of storage devices 102-1, 102-2, an ambient condition detector 104, and a controller 106. The first storage device and second storage device can take the form of non-volatile memory generally referred to in the art as flash memory or a disk drive such as a magnetic hard disk drive or optical disk drive. In some examples, the first and second storage device may be components of a larger device. The storage system 100 is subject to varying ambient conditions downhole such as temperatures ranging from a minimum temperature to a maximum temperature and/or vibration levels ranging from a minimum vibration level to a maximum vibration level. The temperature may be indicative of thermal energy downhole. The vibration levels may be indicative of one or more of motion, oscillation, and/or force experienced downhole. The temperatures may increase as a function of depth in the geologic formation while the vibration level may change based on downhole activities such as drilling of the borehole. The ambient condition detector 104 may determine the ambient condition downhole in terms of a value such as the temperature and/or vibration level downhole. For example, the ambient condition detector 104 may be a temperature sensor and/or vibration sensor. The temperature sensor may take the form of contact sensors such as thermocouples and thermistors that touch an object they are to measure, and noncontact sensors that measure thermal radiation released by a heat source downhole in terms of a temperature. The vibration sensor may include contact-based piezoelectric sensors, strain sensors, optical, and/or capacitive sensors for measuring vibration downhole in terms of a vibration level. The controller 106 stores the data in the first storage device 102-1 if the value of the ambient condition downhole is less than or equal to a threshold. Alternatively, the controller 106 stores the data in a second storage device 102-2 if the value of the ambient condition downhole is greater than the threshold.

The first storage device 102-1 and the second storage device 102-2 may have a storage attribute with different values. For example, the first storage device 102-1 and second storage device 102-2 may have a storage attribute associated with power consumption, where the first storage device 102-1 has a lower value of power consumption compared to the second storage device 102-2. In some embodiments, the first storage device 102-1 and second storage device 102-2 are non-volatile memory. The first storage device 102-1 may be arranged to consume less power in storing data for a given range of temperature compared to the second storage device 102-2, making the first storage device 102-1 desirable to use so long as the storage system 100 operates in the range of temperature. Outside of this given range, the first storage device 102-1 might not be able to store the data, but the second storage device 102-2 is able to store the data but with higher power consumption. The first storage device 102-1 is not able to store the data because the power is insufficient to prevent the data from being corrupted and no longer represents what was originally stored. The storage system with storage devices 102-1, 102-2 is able to store data using less power, where power available downhole is limited, than if the storage system only has the second storage device 102-2 which can store data both within and outside of the temperature range, but consume more power. Alternatively, the first storage device 102-1 and second storage device 102-2 may have a storage attribute associated with power consumption, where the first storage device 102-1 has a higher value of power consumption compared to the second storage device 102-2.

As another example, the first storage device 102-1 and second storage device 102-2 may have a storage attribute associated with storing and/or retrieving data from memory (i.e., a data transfer rate), where the first storage device 102-1 has a higher value of a data transfer rate compared to the second storage device 102-2. In some embodiments, the first storage device 102-1 and second storage device 102-2 are non-volatile memory. The first storage device 102-1 may be arranged to have a higher data transfer rate for a given range of temperature compared to the second storage device 102-2, making the first storage device 102-1 desirable to use so long as the storage system 100 operates in the range of temperature. Outside of this given range, the first storage device 102-1 might not be able to store the data, but the second storage device 102-2 is able to store the data but with a slower data transfer rate. The first storage device 102-1 is not able to store the data because the higher data transfer rates causes the data to be corrupted and no longer represent what was originally stored. The storage system with storage devices 102-1, 102-2 is able to store/retrieve data faster than if the storage system only has the second storage device 102-2 which can store/retrieve data both within and outside of the temperature range, but with a slower transfer rate. Alternatively, the first storage device 102-1 and second storage device 102-2 may have a storage attribute associated with a data transfer rate, where the first storage device 102-1 has a lower value of a data transfer rate compared to the second storage device 102-2.

As yet another example, the first storage device 102-1 and second storage device 102-2 may have a storage attribute associated with memory density, where the first storage device 102-1 has a higher value of memory density compared to the second storage device 102-2. In some embodiments, the first storage device 102-1 and second storage device 102-2 are non-volatile memory. The first storage device 102-1 may be arranged with a higher memory density for a given range of temperature compared to the second storage device 102-2, making the first storage device 102-1 desirable to use so long as the storage system 100 operates in the ramie of temperature. Outside of this given range, the first storage device 102-1 might not be able to store the data, but the second storage device 102-2 is able to store the data but occupying more space. The first storage device 102-1 is not able to store the data because the higher value of the memory density results in the data being corrupted and no longer representing what was originally stored. The storage system with storage devices 102-1, 102-2 is able to store more data in a smaller amount of space, which might be limited downhole, than if the storage system only has the second storage device 102-2 which can store data both within and outside of the temperature range, but less data in the same space. Alternatively, the first storage device 102-1 and second storage device 102-2 may have a storage attribute associated with memory density, where the first storage device 102-1 has a lower value of memory density compared to the second storage device 102-2.

As another example, the first storage device 102-1 and second storage device 102-2 may have a storage attribute associated of vibration resistance, where the first storage device 102-1 has a lower value of vibration resistance compared to the second storage device 102-2. In some embodiments, the first storage device 102-1 and second storage device 102-2 are disk drives. The first storage device 102-1 may be arranged with a lower vibration resistance for a given range of vibration levels compared to the second storage device 102-2, making the first storage device 102-1 desirable to use so long as the storage system 100 operates in the range of vibration level. For example, disks in the first storage device 102-1 may be closer together than disks in the second storage device 102-2 such that there is a greater chance for vibration to cause the disks in the first storage device 102-1 to hit each other causing data corruption as a vibration level increases. Outside of this given range, the first storage device 102-1 might not be able to store the data, but the second storage device 102-2 is able to store the data but occupying more space due to its higher vibration resistance. The first storage device 102-1 is not able to store the data because the higher vibration level results in the data being corrupted and no longer representing what was originally stored. The storage system with storage devices 102-1, 102-2 is able to store more data in a smaller amount of space, which might be limited downhole, than if the storage system only has the second storage device 102-2 which can store data both within and outside of the vibration range, but less data in the same space. Alternatively, the first storage device 102-1 and second storage device 102-2 may have a storage attribute associated of vibration resistance, where the first storage device 102-1 has a higher value of vibration resistance compared to the second storage device 102-2.

Figure 2:
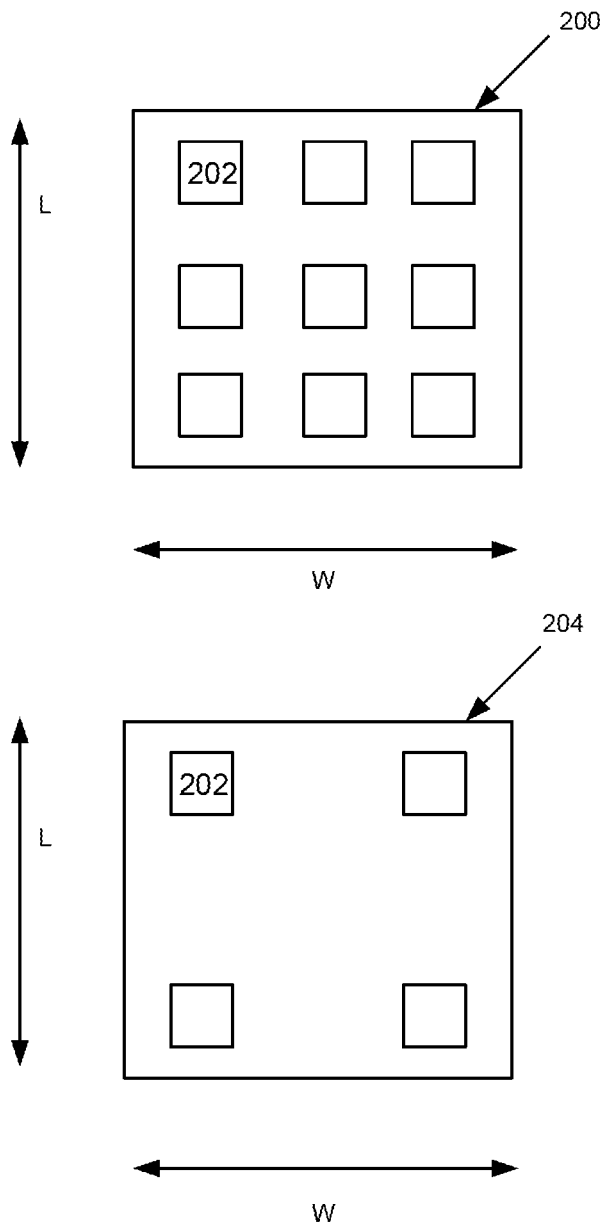
FIG. 2 illustrates an example storage device of the storage system in the form of non-volatile memory.

FIG. 2 illustrates, an example structure of the storage devices 102-1, 102-2 shown as non-volatile memory 200, 204 when they differ by density. The non-volatile memory 200, 204 may be composed of cells 202 which store data in the form of one or more bits or some other representation. The cells 202 are further arranged with a certain memory density. The density refers to a distance that cells 202 associated with storing the data are spaced apart in a fixed area. The fixed area may be indicated by one or more of a length L and width W defined by packaging or space constraints in an area where the non-volatile memory 200, 204 is located. In this regard, for the fixed area, the higher memory density may be able to store more data than the lower memory density because the higher memory density has more cells than the lower memory density. The higher memory density means that the cells 202 are spaced closer together while the lower memory density means that the cells 202 are spaced further apart in the fixed area. An example of a higher memory density is shown as non-volatile memory 200 which might be the SD memory which reliably stores data at temperatures up to 140° C. while an example of a lower memory density is shown as memory 204 which might be NAND memory which reliably stores data at temperatures up to 200° C. The densities are shown as grid patterns in 200, 204 but the cells 202 may be arranged in other uniform or non-uniform multi-dimensional patterns subject to spacing constraints.

Figure 3:
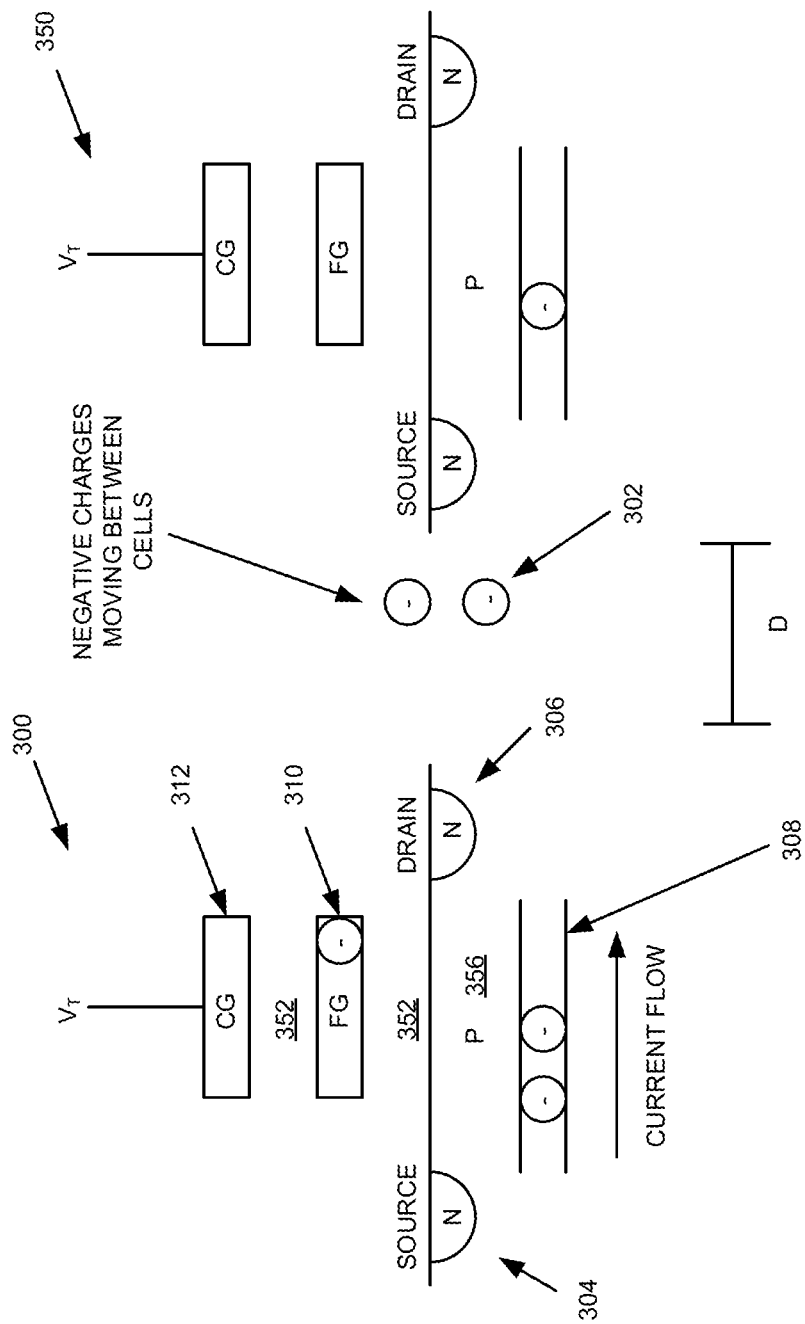
FIG. 3 illustrates an example operation of a cell of the non-volatile memory and effect of temperature on reading data from the cell.

FIG. 3 illustrates an example operation of the cell 202. The cell 202, shown as cell 300, can be seen as an electrical switch such as a transistor in which current flows between two terminals (source 304 and drain 306 having a negative charge N) via a channel 308 in a positive charge P substrate 356 and is controlled by a floating gate 310 (FG) and control gate 312 (CG). The FG 310 is interposed between the CG 312 and the channel 308. The FG 310 is electrically isolated by an insulating layer 352. The insulating layer 352 traps electrons 302 placed on the FG 310. In this regard, the cell 300 is programmed by placing electrons 302 on the FG 310 and/or removing electrons 302 from the FG 310. The presence or absence of the electrons 302 on the FG 310 produces a given charge (or lack thereof) on the FG 310 indicative of the cell 300 storing certain logic.

The cell 300 may have a threshold voltage which is a voltage applied to the CG 312 to cause the channel 308 to conduct current. The threshold voltage may be $V_{T1}$ if a given charge is not on the FG 310 and $V_{T2}$ if a given charge is on the FG 310. In order to read a value from the cell 300, an intermediate voltage between the threshold voltages ($V_{T1}$ & $V_{T2}$) is applied to the CG 312. When the FG 310 has the given charge, then the given charge screens an electric field from the CG 312, such that a higher voltage ($V_{T2}$) must be applied to the CG 312 to make the channel 308 conductive. If the channel 308 conducts electrons 302 at the intermediate voltage, the FG 310 must not have least the given charge (if it was charged, conduction would not occur because the intermediate voltage is less than $V_{T2}$), and hence, a logical "1" is stored in the FG 310, for example. If the channel 308 does not conduct at the intermediate voltage, then the FG 310 has at least the given charge, and hence, a logical "0" is stored in the FG 310, for example. Presence of a logical "0" or "1" is sensed by determining whether current is flowing through the channel 308 when the intermediate voltage is asserted on the CG 312. In a multi-level cell device, which stores more than one bit per cell, an amount of current flow is sensed (rather than simply its presence or absence), in order to determine the level of charge on the FG 310.

Electrons 302 on the FG 310 and electrons 302 passing through the channel 308 (shown as a circle with a negative charge) have a higher mobility as temperature increases. The higher mobility means that there is an increased chance of the electrons 302 moving from one cell 300 to another cell 350 in the non-volatile memory, affecting current in the other cell 350 passing through a respective channel and electrons 302 on the respective FG of the other cell 350. Higher data transfer rates to and from the cells associated with storing and retrieving data at the higher temperatures also increases chances of electrons moving to different cells. Movement of the electrons 302 in this manner may result in data stored in a cell being incorrectly read (a cell which stored a logical "1" is read to store a logical "0" and vice versa). The data is corrupted. The cell 300 and cell 350 may be separated by a distance D. The higher memory density has an increased chance for corruption because the cells are closer together (D is small). The electrons 302 may be able to easily move from one cell 300 to another cell 350 because of the close distance. The lower memory density has a less chance for corruption because the cells 300, 350 are further apart (D is large). The electrons 302 may not be able to easily move from one cell to another cell because of the further distance resulting in lessened chance for corruption because the cells are further apart. In this regard, reliability of the non-volatile memory may depend on a memory density of the non-volatile memory and temperature. For example, high memory density may be a low temperature memory, meaning it stores data reliably at low temperatures and low memory density may be a high temperature memory, meaning it stores data reliably at high temperatures. Further, in one or more examples, 50% of the storage system may have one density of memory and 50% of the storage system 100 may have another density of non-volatile memory.

Figure 4:
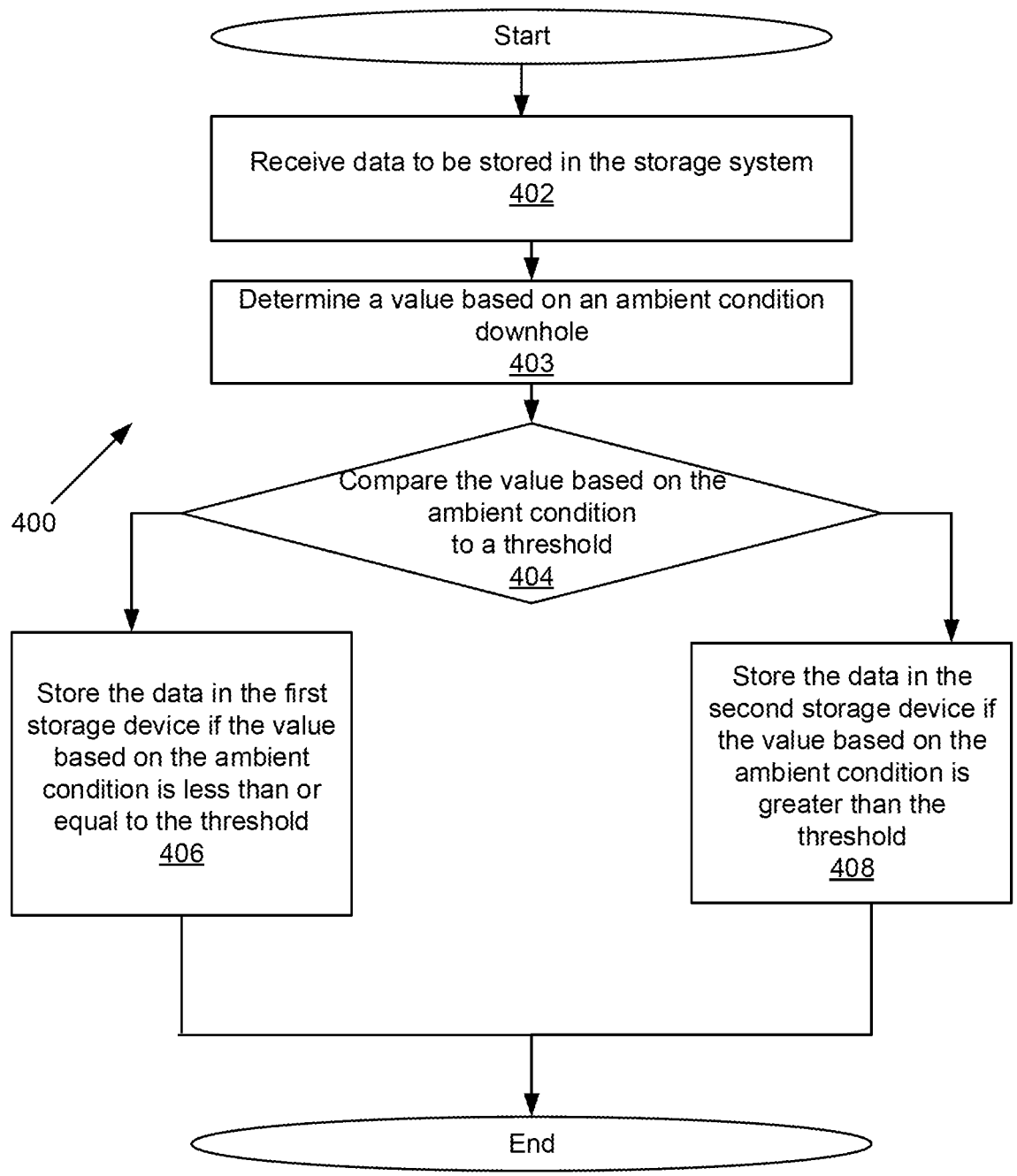
FIG. 4 is a flow chart of example functions associated with the storage system which stores data in a storage device based on the value of the ambient condition.

FIG. 4 is a flow chart 400 of example functions associated with the storage system which stores data in different storage device based on an ambient condition downhole. The functions may be performed by one or more of the controller in hardware, software, or a combination of hardware and software.

At 402, the controller receives data to be stored in the storage system. The data may be received from the data source, and take many forms. The storage system may include a first storage device and a second storage device. At 403, the ambient condition detector determines a value based on an ambient condition downhole. The value based on the ambient condition may be a temperature and/or vibration level downhole in a borehole of a geologic formation where the storage system is located or some function of the temperature and/or vibration level. The value based on the ambient condition may indicate whether the first storage device is to store the data, where it is advantageous to store the data in first storage device rather than the second storage device so long as the first storage device can store the data. The advantages may include or more of less power consumption, faster data transfer rates, and/or higher density of storage, among other reasons.

At 404, the value based on the ambient condition downhole is compared to a threshold. The threshold may be a temperature and/or vibration level, depending on the value based on the ambient condition determined at 403 and type of the storage devices.

At 406, the controller stores the data in the first storage device if the value based on the ambient condition is less than or equal to the threshold. For example, when the storage devices are non-volatile memory, the first storage device with a higher value of a storage attribute associated with memory density rather than the second storage device may store the data when the ambient condition value of temperature is less than or equal to the threshold. As another example, when the storage devices are non-volatile memory, the first storage device with a higher value of a storage attribute associated with a data transfer rate rather than the second storage device may store the data when the ambient condition value of temperature is less than or equal to the threshold. In yet another example, when the storage devices are non-volatile memory, the first storage device with a lower value of a storage attribute associated with power consumption rather than the second storage device may store the data when the ambient condition value of temperature is less than or equal to the threshold. As another example, when the storage devices are disk drives, the first storage device with a lower value of a storage attribute associated with vibration resistance rather than the second storage device may store the data when the ambient condition value of vibration level is less than or equal to the threshold. Other variations are also possible.

At 408, the controller stores the data in a second storage device if the value based on the ambient condition is greater than the threshold. For example, when the storage devices are non-volatile memory, the second storage device with a lower value of a storage attribute associated with density rather than the first storage device may store the data when the ambient condition value of temperature is greater than the threshold. As another example, when the storage devices are non-volatile memory, the second storage device with a lower value of a storage attribute associated with a data transfer rate rather than the first storage device may store the data when the ambient condition value of temperature is greater than the threshold. In yet another example, when the storage devices are non-volatile memory, the second storage device with a higher value of a storage attribute associated with power consumption rather than the first storage device may store the data when the ambient condition value of temperature is greater than the threshold. As another example, when the storage devices are disk drives, the second storage device with a higher value of a storage attribute associated with vibration resistance rather than the first storage device may store the data when the ambient condition value of vibration level is greater than the threshold. Other variations are also possible.

Figure 5:
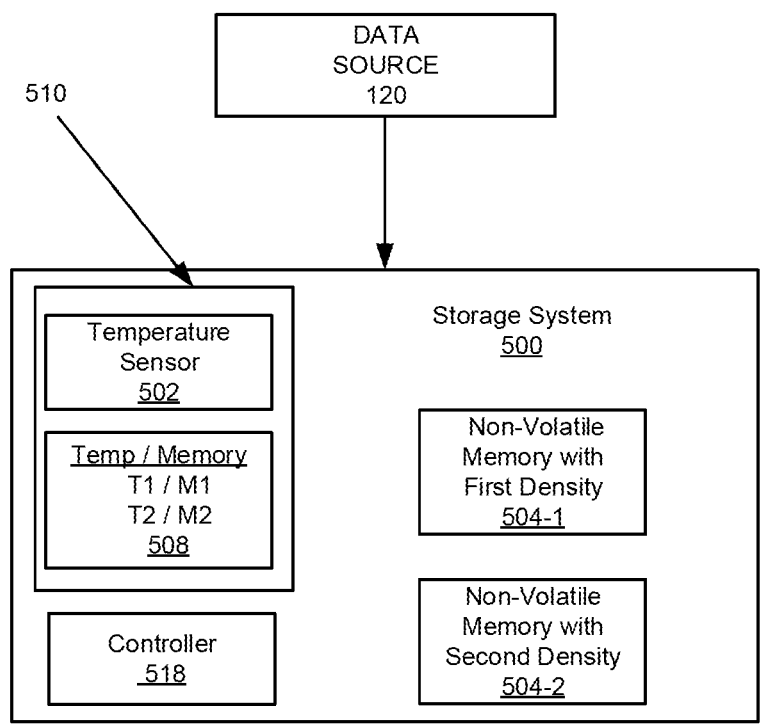
FIG. 5 is a block diagram of an example storage system which stores data in a non-volatile memory based on temperature downhole in the borehole.

FIG. 5 is a block diagram of the example storage system 100 arranged to store data in different memory densities based the ambient condition detector determining a temperature downhole. The storage system 500 has an ambient condition detector 510 which includes a temperature sensor 502 and memory storage table 508, two or more non-volatile memory 504-1, 504-2, and a controller 518. In one or more examples, the two or more memory 504-1, 504-2 may be physically in a same package. The temperature sensor 502 may measure a temperature of an environment in which the storage system 500 is located. The controller 518 may be hardware, software, and/or a combination of hardware and software for facilitating storage of data in the non-volatile memory 504. The two or more non-volatile memory 504 (shown as 504-1 and 504-2) may be an electronic (solid-state) memory for storing data such as bits, generally referred to in the art as flash memory. For example, non-volatile memory 504-2 may take the form of NAND memory and non-volatile memory 504-1 may take the form of a Secure Digital (SD) memory such as a microSD card. The memory may take other forms as well.

The non-volatile memory 504-1 and non-volatile memory 504-2 may be arranged such that there is a greater chance that data stored in the non-volatile memory 504-1 which has a higher density will be corrupted as temperature increases compared to the non-volatile memory 504-2. Conversely, there is a lesser chance that data stored in the non-volatile memory 504-2 which has a lower density will be corrupted as temperature increases compared to non-volatile memory 504-1.

To illustrate, one non-volatile memory 504-1 may store data up to a first given temperature T1 such as 140° C. and another non-volatile memory 504-2 may store data up to a second given temperature T2 such as 200° C., where the first temperature is less than the second temperatures. The ambient condition detector 510 may have a memory storage table 508 indicative of which non-volatile memory 404 to store data at which temperature. For example, the memory storage table 508 indicates that memory M1 such as 504-1 is to store the data up to temperature T1 and memory M2 such as 504-2 is to stores the data up to temperature T2, where T1 and T2 are temperature thresholds. The memory M1 may be a low temperature memory and the memory M2 may be a high temperature memory in this example.

Based on the memory storage table 508 and the indication of the temperature by the temperature sensor 502, the controller 406 stores the data in the non-volatile memory 504-1 or non-volatile memory 504-2. If the non-volatile memory 504 differs by density and the non-volatile memory 504-1 has a greater density than the non-volatile memory 504-2, the storage system 500 is able to reliably store more data (without corruption) in a fixed amount of space than if the data is stored in a storage system with only a single lower memory density in that same fixed amount of space. Further, data is not stored in lower memory density if the higher memory density reliably stores the data. This avoids the lower memory density being filled with data that could be reliably stored in the higher memory density. The storage system 500 allows for increasing storage of data when space is limited, among other reasons.

Figure 6:
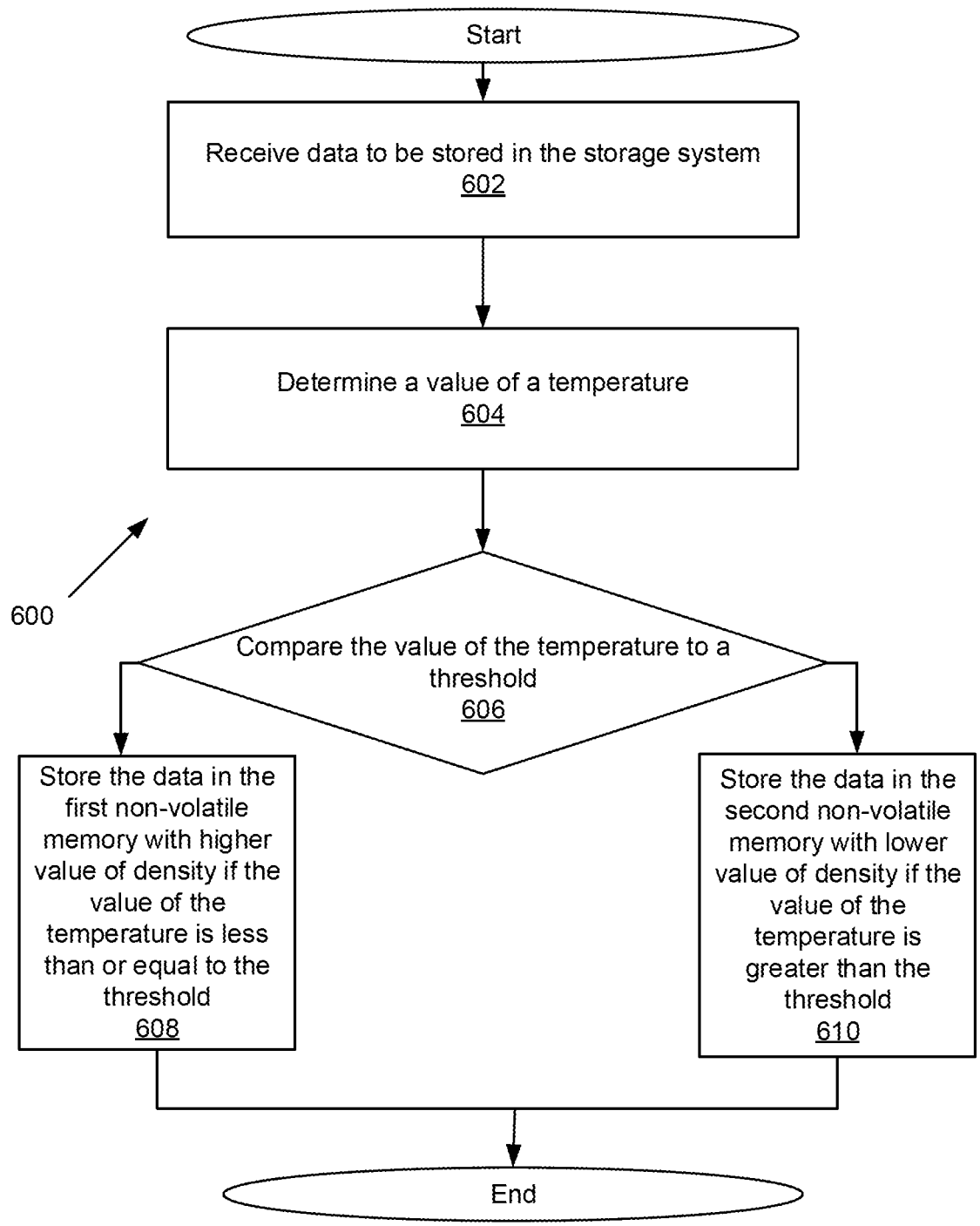
FIG. 6 is a flow chart of example functions associated with the storage system which stores data in a non-volatile memory based on the temperature downhole in the borehole.

FIG. 6 is a flow chart 600 of example functions associated with the storage system storing data in a non-volatile memory with a given value of a storage attribute of memory density based on temperature. A higher value of the storage attribute of memory density means that the memory is more dense than a lower value of the storage attribute. The functions may be performed by one or more of the controller and ambient condition detector in hardware, software, or a combination of hardware and software.

At 602, the controller receives data to be stored in the storage system. The data may be received from the data source, and take many forms.

At 604, the ambient condition detector determines a value of a temperature. The temperature may be a temperature in a borehole of a geologic formation where the storage system is located.

At 606, the controller compares the value of the temperature to a threshold. The threshold may be a temperature indicative of which non-volatile memory to store the data in.

At 608, the controller stores the data in the first non-volatile memory with the higher value of the density if the value of the temperature is less than or equal to the temperature threshold.

At 610, the controller stores the data in a second non-volatile memory with lower value of the density if the value of the temperature is greater than the temperature threshold.

The non-volatile memory that is selected is that non-volatile memory which has a higher memory density for being able to store the data at the temperature, and non-volatile memory with a lower memory density is not used when the higher memory density can still store the data at the temperature. This way space in the storage system is efficiently utilized. In some examples, the controller may store the data in the non-volatile memory along with a timestamp which indicates a time when the data was stored. This way data may be stored in different locations in the selected non-volatile memory. The timestamp may be used to order the data in chronological order based on the timestamps when the data is read out from the non-volatile memory.

Figure 7:
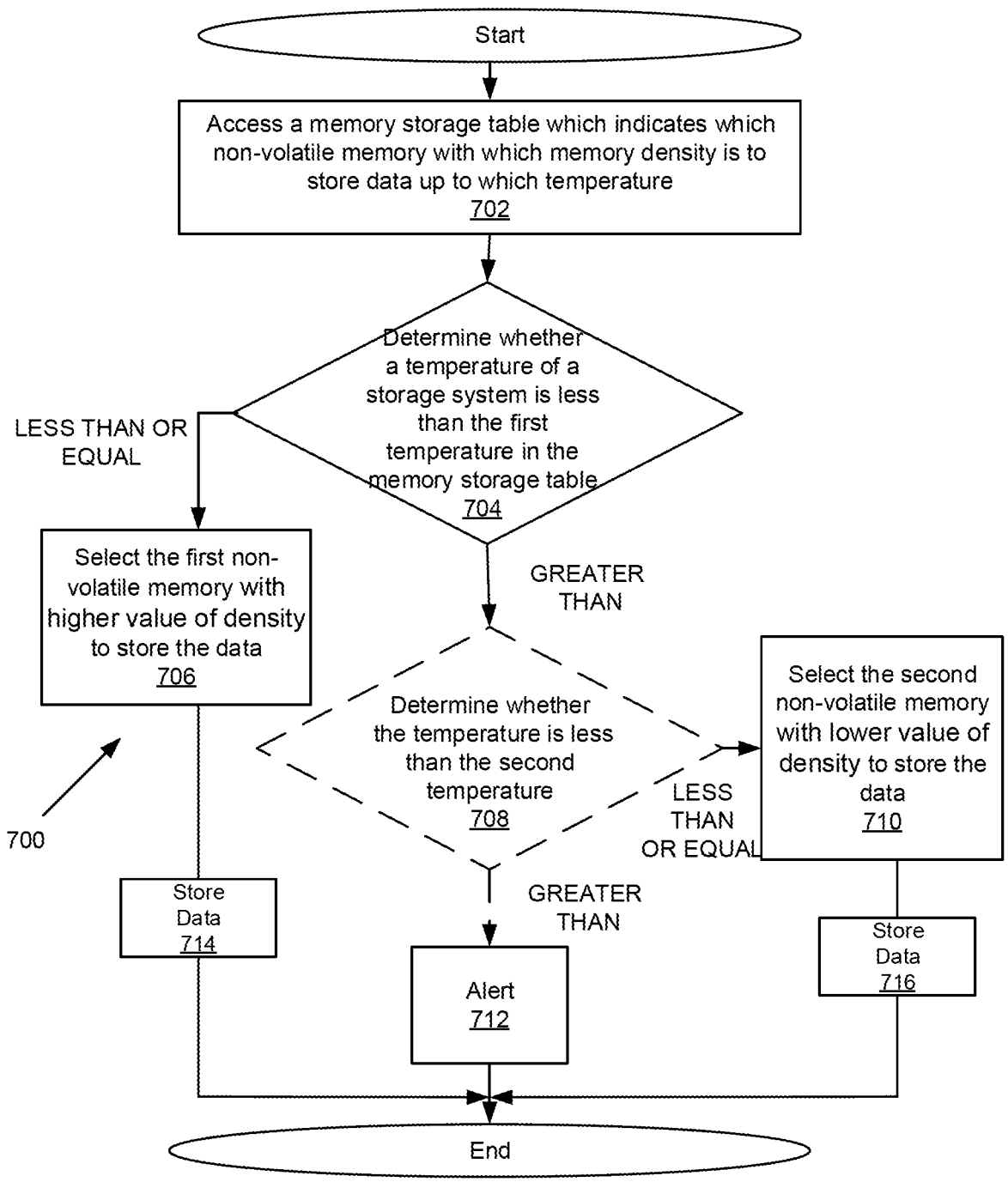
FIG. 7 is a flow chart of example functions associated with the controller selecting the non-volatile memory from the two or more non-volatile memory of different densities to store the data based on the temperature downhole in the borehole.

FIG. 7 is a flow chart 700 of example functions associated using the memory access table to store data in a non-volatile memory with a given value of a storage attribute of density based on temperature. The functions may be associated with the function at block 606 of FIG. 6, among other blocks.

At 702, the controller may access the memory storage table which indicates which non-volatile memory with which memory density is to store data up to which temperature. The memory storage table may be stored on the storage system and/or received from a remote location. The memory storage table may indicate that a first non-volatile memory with a higher value of memory density is to store data up to a first temperature and the second non-volatile memory with lower value of memory density is to store data up to a second temperature, where the first temperature is less than the second temperature. At 704, the ambient condition detector may determine whether a temperature of a storage system is less than the first temperature. If the temperature is less than the first temperature, then at 706, the controller selects the first non-volatile memory with higher value of memory density and stores the data at 714 in the selected memory. Alternatively, at 710, the controller selects the second non-volatile memory with lower value of memory density and stores the data at 716 in the selected memory. If the temperature is greater than the second temperature, the data cannot be stored in the storage system since the data would get corrupted due to the temperature. Optionally, as shown by block 708 illustrated by dotted lines, the controller may further determine if the temperature is less than the second temperature. If the temperature is less than the second temperature, then at 710 the second non-volatile memory is selected to store the data. If the temperature is greater than the second temperature, then, at 712 the controller may raise an alert to indicate that the storage system cannot store the data in the storage system. The alert may be audible or visual, among other types. Additionally, or alternatively, the controller may send the data already stored in the storage system to a remote location such as a computer on the surface of the geologic formation to prevent corruption of the data.

In one or more examples, the controller may downsample the data to efficiently store the data in the second storage device when the storage devices are non-volatile memory of different densities or disk drives. For instance, the controller may store every other sample of the data or some other fraction. This way data over a longer period of time may be stored in the second storage device without filing up since the second storage device may stores less data than the first storage device. The downsampling method may be considered an example of a lossy compression algorithm. Additionally, or alternatively, the controller may compress the data for storage in the second storage device of the second density using various lossless data compression algorithms such as Lempel-Ziv (LZ) compression methods. The data stored in the first storage device of the first density may not be compressed and/or downsampled because the first storage device of the first density has a higher density compared to the second storage device of the second density, but data stored in one or more of the storage device of the first density and storage device of the second density might be compressed and/or downsampled in some examples.

The storage system in the above descriptions is shown as having two storage device. The storage system may have more than two storage devices so that the storage system has storage device with more than two densities. Principles discussed above would extend to the increased number of storage device.

Figure 8:
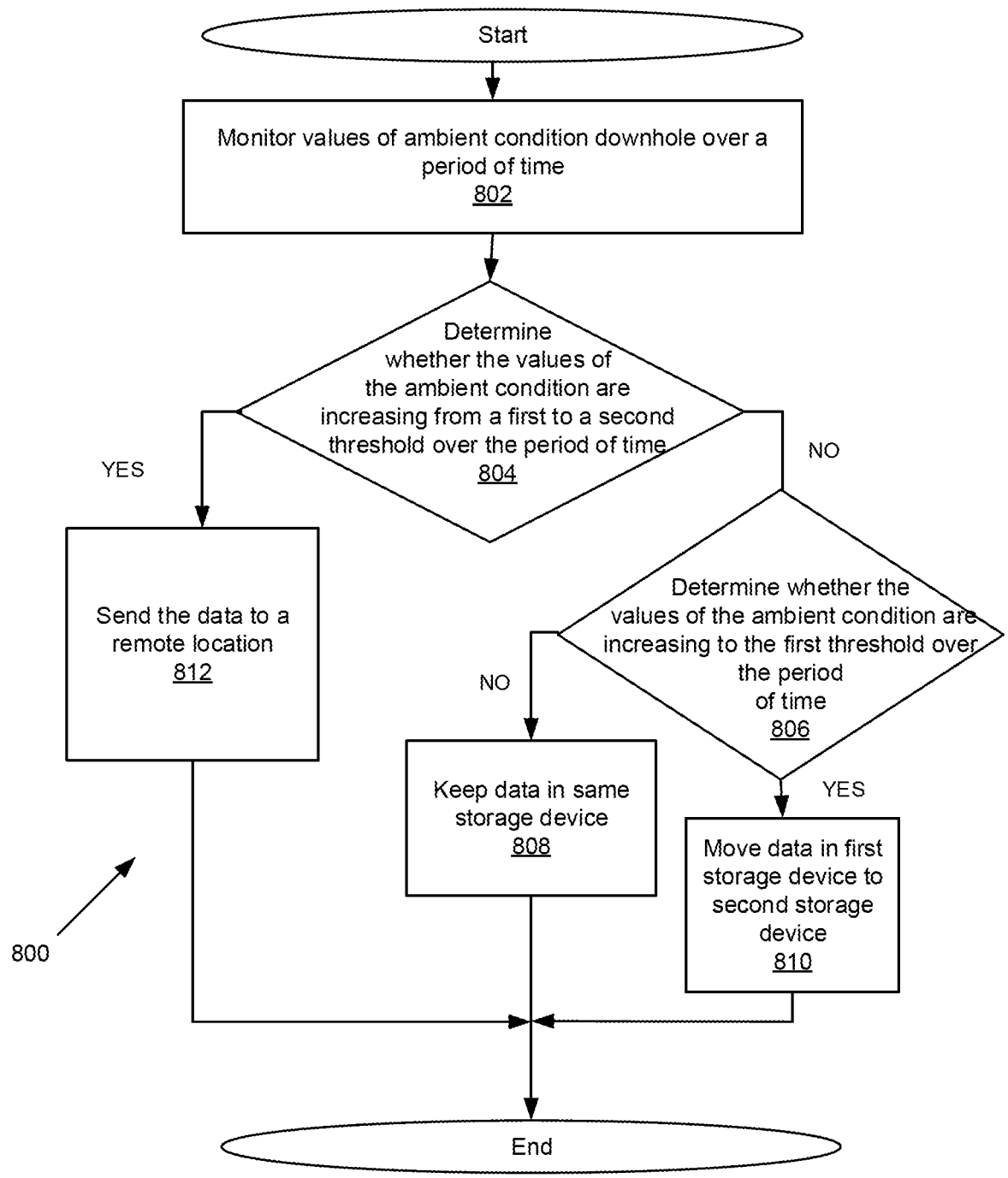
FIG. 8 is a flow chart of example functions associated with preventing corruption of the stored data in a storage device based on the value of the ambient condition.

FIG. 8 is a flow chart of functions 800 associated with ensuring that data that is stored in the storage system described above is not later corrupted by an ambient condition downhole such as high temperature or high vibration levels. The functions may be performed by one or more of the controller and/or ambient condition detector in hardware, software, or a combination of hardware and software.

At 802, the ambient condition detector monitors values of an ambient condition downhole over a period of time.

At 804, the controller determines whether the values of the ambient condition determined by the ambient condition detector is increasing from a first ambient condition threshold to a second higher ambient condition threshold over the period of time, where the storage system cannot store the data if the ambient condition crosses the second threshold. For example, indications of values of the ambient condition over time may have a positive slope or trend and be within a given range of the second threshold.

If the values are increasing at 804, then at 812 the controller may send the data to a remote location such as a computer on the surface of the geologic formation because the storage system cannot store the data.

If the values are not increasing at 804, then at 806 a determination is made whether the values of the ambient condition are increasing to the first threshold over the period of time. If the values of the ambient condition are increasing at 806, then at 810, the data in the first non-nonvolatile memory is moved to the second storage device because the first storage device may not be able to store the data as the values of the ambient condition increase. The stored data in the first storage device will get corrupted. In some examples, any further data that is received by the controller is stored in the second storage device. If the values of the ambient condition are not increasing at 806. then the data is kept in the same storage device at 808. This way the data can be preserved as the values of the ambient condition increases and the data is not corrupted by the ambient condition.

Figure 9:
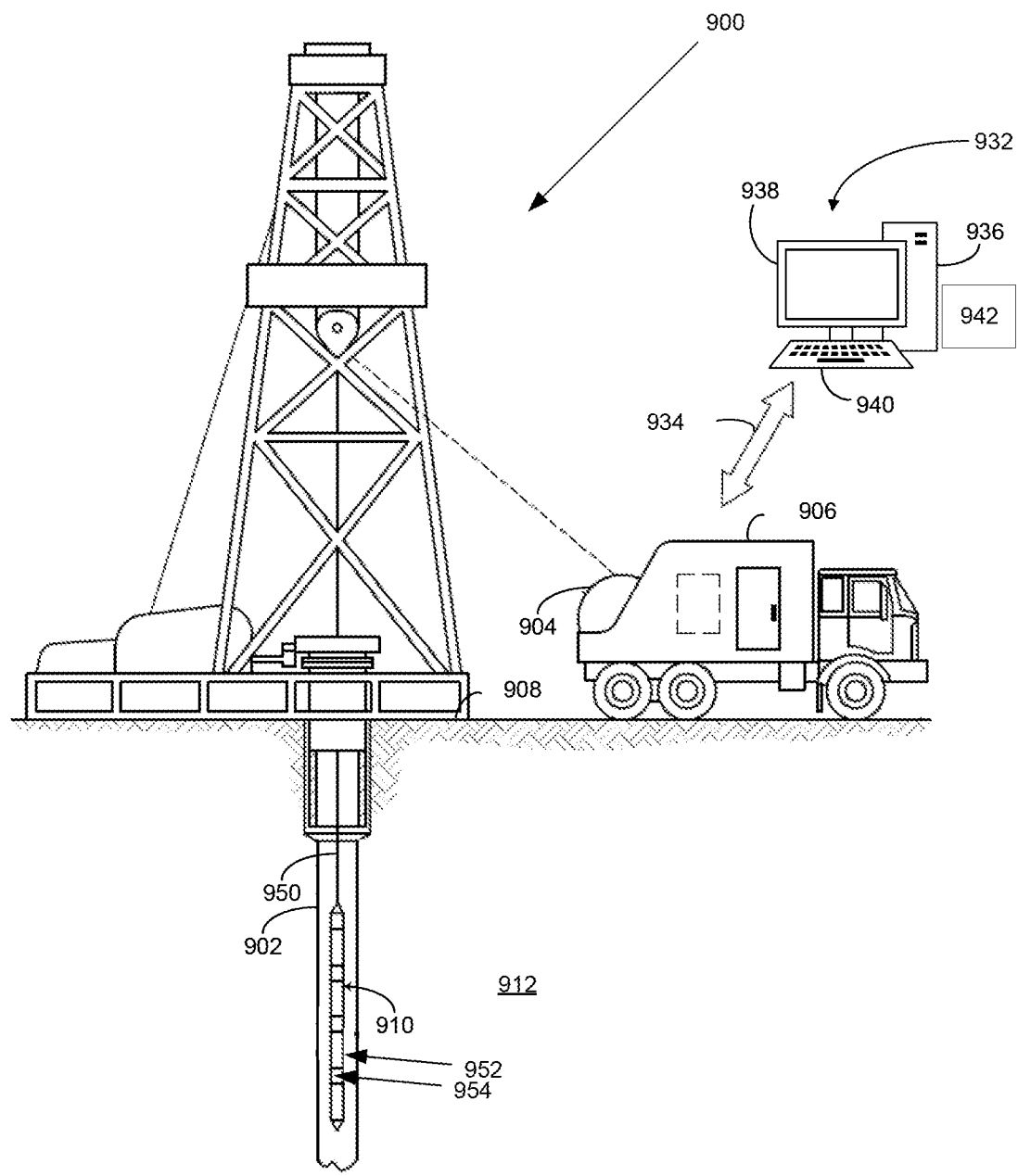
FIG. 9 is a schematic diagram of example apparatus that can be used to perform some of the operations and functions described with reference to FIGS. 1-8.

FIG. 9 is a schematic diagram of an apparatus 900 that can be used to perform some of the operations and functions described with reference to FIGS. 1-8. The apparatus 900 shows tool 910 on a wireline 950. As illustrated, a borehole 902 may extend through the geologic formation 912. It should be noted that while FIG. 9 generally depicts a land-based drilling system, those skilled in the art will readily recognize that the principles described herein are equally applicable to subsea drilling operations that employ floating or sea-based platforms and rigs, without departing from the scope of the disclosure.

As illustrated, hoist 904 may be used to run the tool 910 into borehole 902. Hoist 904 may be disposed on a recovery vehicle 906. Hoist 904 may be used, for example, to raise and lower wireline 950 in borehole 902. While hoist 904 is shown on recovery vehicle 906, it should be understood that wireline 950 may alternatively be disposed from a hoist 904 that is installed at the surface 908 instead of being located on recovery vehicle 906. Tool 910 may be suspended in borehole 902 on wireline 950. Other conveyance types may be used for conveying tool 910 into borehole 902, including coiled tubing, wired drill pipe, slickline, and downhole tractor, for example. Tool 910 may comprise a tool body, which may be elongated as shown on FIG. 9. Tool body may be any suitable material, including without limitation titanium, stainless steel, alloys, plastic, combinations thereof, and the like. Tool 910 may further include sensors 954 for measuring various properties of the geologic formation 912 such as resistivity and conductivity of the geologic formation based on natural gamma ray, electrical, acoustic, pressure, stimulated radioactive, electromagnetic, and/or nuclear magnetic resonance measurements. The sensors 954 may also measure a value of an ambient condition downhole, such as temperature and/or vibration level. The tool 910 may also have a storage system 952 with storage devices having different storage attributes. The storage system 952 may store data associated with measured properties of the geologic formation 912 in a storage device of the storage system 954 based on the value of the ambient condition as described herein.

Computer system 932 may include a processing unit 936, a monitor 938, an input device 940 such as a keyboard and/or mouse, and/or machine readable media 942 such as optical disks and/or magnetic disks that can store code for analyzing the data from the storage system 952. The computer system 932 may be located at the surface 908. Communication link 934 may implement one or more of various known telemetry techniques such as mud-pulse, acoustic, and/or electromagnetic to transmit the data to the surface 908 for analysis. In addition to, or in place of analysis at the surface 908 by the computer system 932, analysis may occur downhole by the tool 910.

Figure 10:
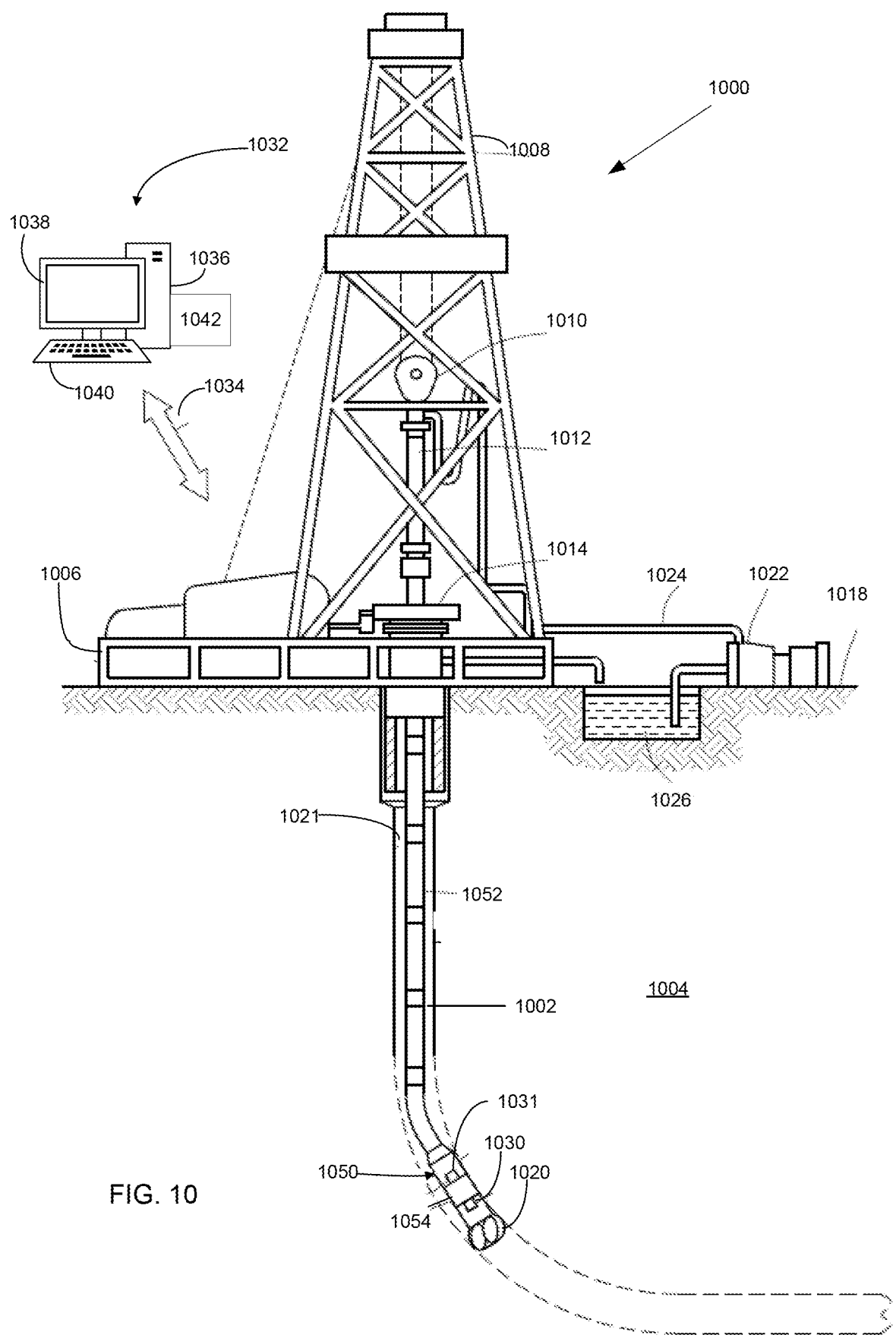
FIG. 10 is another schematic diagram of example apparatus to perform some of the operations and functions described with reference to FIGS. 1-8.

FIG. 10 is, another schematic diagram of an apparatus 1000 that can be used to perform some of the operations and functions described with reference to FIGS. 1-8. The apparatus 1000 includes a tool 1050 disposed on a drill string 1052 of the apparatus 1000. As illustrated, a borehole 1002 may extend through geologic formation 1004. While borehole 1002 is shown extending generally vertically into the geological formation 1004, the principles described herein are also applicable to boreholes that extend at an angle through the geological formation 1004, such as horizontal and slanted boreholes. For example, although FIG. 10 shows a vertical or low inclination angle well, high inclination angle or horizontal placement of the well and equipment is also possible. It should further be noted that while FIG. 10 generally depicts a land-based operation, those skilled in the art will readily recognize that the principles described herein are equally applicable to subsea operations that employ floating or sea-based platforms and rigs, without departing from the scope of the disclosure.

The apparatus further includes a drilling platform 1006 that supports a derrick 1008 having a traveling block 1010 for raising and lowering drill string 1052. Drill string 1052 may include, but is not limited to, drill pipe and coiled tubing, as generally known to those skilled in the art. A kelly 1012 may support drill string 1052 as it may be lowered through a rotary table 1014. A drill bit 1020 may be attached to the distal end of drill string 1052 and may be driven either by a downhole motor and/or via rotation of drill string 1052 from the surface 1018. Without limitation, drill bit 1020 may include, roller cone bits, PDC bits, natural diamond bits, any hole openers, reamers, coring bits, and the like. As drill bit 1020 rotates, it may create and extend borehole 1002 that penetrates various subterranean formations such as 1004. A pump 1022 may circulate drilling fluid through a feed pipe 1024 to kelly 1012, downhole through interior of drill string 1052, through orifices in drill bit 1020, back to surface 1018 via annulus 1021 surrounding drill string 1052, and into a retention pit 1026.

Drill bit 1020 may be just one piece of a downhole assembly that may include the tool 1050. Tool 1050 may be made of any suitable material, including without limitation titanium, stainless steel, alloys, plastic, combinations thereof, and the like. Tool 1050 may further include one or more sensors, such as two or more sensors 1030, 1031, positioned proximate to the drill bit 1020 with sensors for measuring various properties of the geologic formation such as resistivity and conductivity of the geologic formation based on natural gamma ray, electrical, acoustic, pressure, stimulated radioactive, electromagnetic, and/or nuclear magnetic resonance measurements. Additionally, or alternatively, the sensors 1030, 1031 may measure a value of an ambient condition downhole such as vibration levels associated with the drilling and/or temperature downhole. The tool 1050 may also have a storage system 1054 with storage devices having different storage attributes. The storage system 1054 may store data associated with the measured properties of the geologic formation 912 in a storage device of the storage system 1054 based on the value of the ambient condition as described herein. Alternatively, the storage system 1054 may be located at another position along the drill string 1052. Any suitable technique may be used for transmitting the data to a computer system 1032 residing on the surface 1018. As illustrated, a communication link 1034 (which may be wired or wireless, for example) may be provided that may transmit data from tool 1050 to the computer system 1032 at the surface 1018. Computer system 1032 may include a processing unit 1036, a monitor 1038, an input device 1040 such as a keyboard and/or mouse, and/or machine readable media 1042 such as optical disks and/or magnetic disks that can store code to analyze the measurements from tool 1050. This analysis may occur at the surface 1018 in real-time. Alternatively, the analysis may occur at surface 1018 or another location after withdrawal of the tool 1050 from borehole 1002. Still alternatively, the analysis may be performed downhole in the geologic formation 1004 by the tool 1050.

Figure 11:
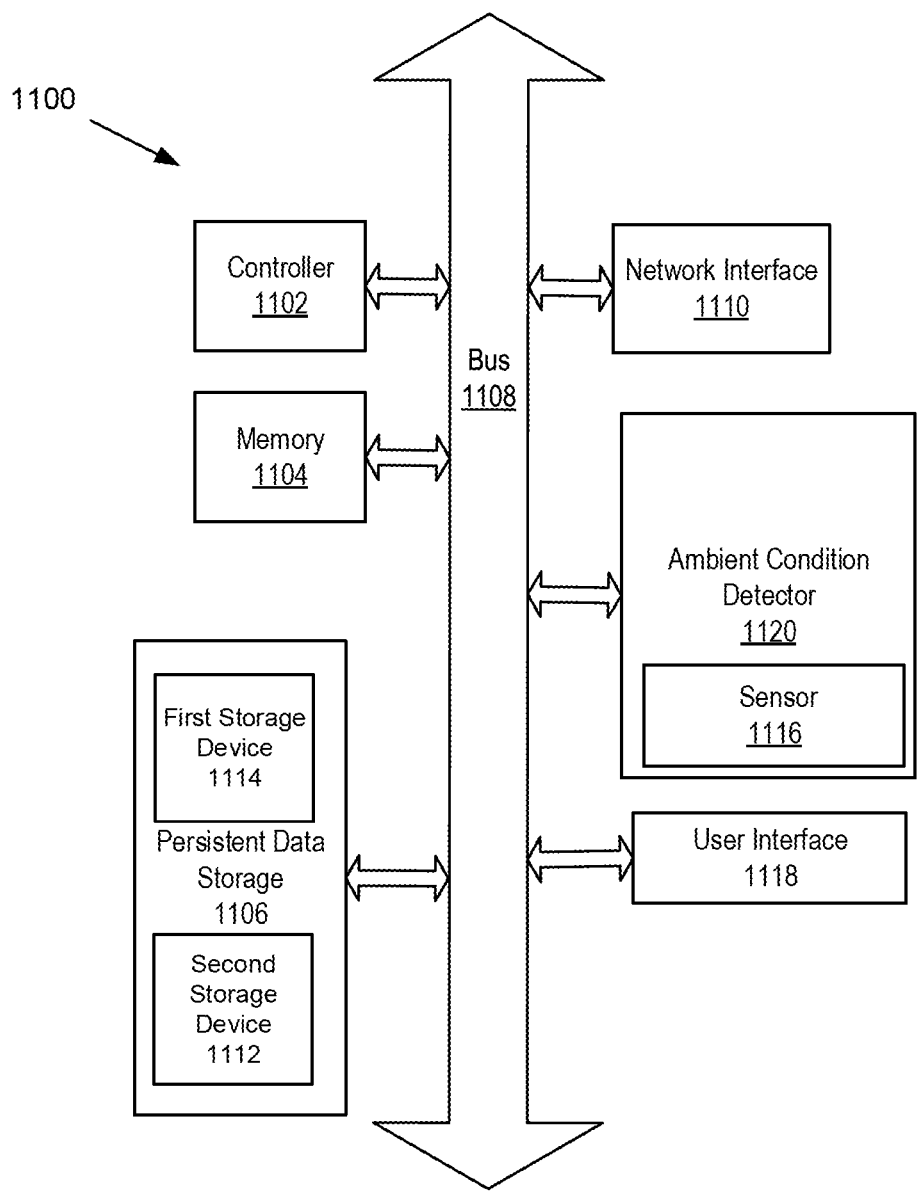
FIG. 11 is a block diagram of the example storage system in more detail.

FIG. 11 is a block diagram of an example storage system 1100 as described above in more detail. The storage system 1100 may be located on the surface, downhole, or partially on the surface and partially downhole.

The storage system 1100 may include a persistent data storage 1106. The persistent data storage 1106 includes at least two different storage device such as a first storage device 1114 with different values of a storage attribute such as NAND memory with low density and second storage device 1112 such as SD memory with high density or disk drives with different vibration resistance. The apparatus also includes a bus 1108 such as PCI, ISA, and/or PCI-Express and a network interface 1110 in communication with a tool for receiving the data to store in the persistent data storage 1106.

The storage system 1100 includes a controller 1102 (possibly including multiple processors, multiple cores, multiple nodes, and/or implementing multi-threading, etc.) and memory 1104. Memory 1104 may be system memory in the form of storage device such as NAND memory with a single density that allows operation over the temperature range in which the storage system 1100 is subjected to, and/or any one or more other possible realizations of non-transitory machine-readable media/medium. The storage system 1100 also includes an ambient condition detector 1120 which determines a value of an ambient condition downhole in which the storage system is located. A sensor 1116 may measure the value of the ambient condition in the form of a temperature and/or vibration.

The storage system 1100 may further comprise a user interface 1118. The user interface 1118 may include a display such as a computer screen or other visual device to show the data stored by the storage system 1100 and/or present alerts associated with operation of the storage system 1100. The alerts may indicate that the storage system cannot reliably store the data. The user interface 1118 may also include an input device such as a mouse, keyboard to adjust thresholds associated with storing the data in which storage device based on the ambient conditions downhole.

The storage system 1100 may implement any one of the previously described functionalities partially (or entirely) in hardware and/or software such as computer code, program instructions, computer instructions and/or program code stored on a non-transitory machine readable medium/media. In some instances, the software is executed by the controller 1102. Further, realizations can include fewer or additional components not illustrated in FIG. 11 such as video cards, audio cards, additional network interfaces, and/or peripheral devices. The controller 1102 and the memory 1104 are coupled to the bus 1108. Although illustrated as being coupled to the bus 1108, the memory 1104 can be coupled to the controller 1102.

Relationships between values of the storage attribute of the first storage device and second storage device in the storage device described above are exemplary in nature. For example, a first non-volatile memory with a lower value of memory density may be used to store data when temperature is below a threshold and a second non-volatile memory with higher value of memory density may be used to store data when the temperature is above the threshold rather than the arrangement described above. As another example, a first non-volatile memory with a higher value of power consumption may be used to store data when temperature is below a threshold and a lower value of power consumption may be used to store data when the temperature is above the threshold rather than the arrangement described above. Similar variations are possible for the other storage attributes.

The disk drive described above has a storage attribute of vibration resistance. The disk drive may have other storage attributes, such as a data transfer rate and/or power consumption. The data may be stored in a disk drive based on a value of these other storage attributes. For example, a first disk drive with a higher value of power consumption may be used to store data when temperature is above a threshold and a disk drive with a lower value of power consumption may be used to store data when the temperature is below the threshold. As another example, a first disk drive with a higher value of a data transfer rate may be used to store data when temperature is below a threshold and a disk drive with a lower value of a data transfer rate may be used to store data when the temperature is above the threshold. Similar variations are possible for the other storage attributes.

The flowcharts are provided to aid in understanding the illustrations and are not to be used to limit scope of the claims. The flowcharts depict example operations that can vary within the scope of the claims. Additional operations may be performed: fewer operations may be performed; the operations may be performed in parallel; and the operations may be performed in a different order. For example, the operations depicted in blocks 402-408, 602-610, 702-716, 802-812 can be performed in parallel or concurrently. It will be understood that each block of the flowchart illustrations and/or block diagrams, and combinations of blocks in the flowchart illustrations and/or block diagrams, can be implemented by program code. The program code may be provided to a processor of a general purpose computer, special purpose computer, or other programmable machine or apparatus.

As will be appreciated, aspects of the disclosure may be embodied as a system, method or program code/instructions stored in one or more machine-readable media. Accordingly, aspects may take the form of hardware, software (including firmware, resident software, micro-code, etc.), or a combination of software and hardware aspects that may all generally be referred to herein as a "circuit," "module" or "system." The functionality presented as individual modules/units in the example illustrations can be organized differently in accordance with any one of platform (ambient system and/or hardware), application ecosystem, interfaces, programmer preferences, programming language, administrator preferences, etc.)

Any combination of one or more machine readable medium(s) may be utilized. The machine readable medium may be a machine readable signal medium or a machine readable storage medium. A machine readable storage medium may be, for example, but not limited to, a system, apparatus, or device, that employs any one of or combination of electronic, magnetic, optical, electromagnetic, infrared, or semiconductor technology to store program code. More specific examples (a non-exhaustive list) of the machine readable storage medium would include the following: a portable computer diskette, a hard disk, a random access memory (RAM), a read-only memory (ROM), an erasable programmable read-only memory (EPROM or Storage device), a portable compact disc read-only memory (CD-ROM), an optical storage device, a magnetic storage device, or any suitable combination of the foregoing. In the context of this document, a machine readable storage medium may be any tangible medium that can contain, or store a program for use by or in connection with an instruction execution system, apparatus, or device. A machine readable storage medium is not a machine readable signal medium.

A machine readable signal medium may include a propagated data signal with machine readable program code embodied therein, for example, in baseband or as part of a carrier wave. Such a propagated signal may take any of a variety of forms, including, but not limited to, electromagnetic, optical, or any suitable combination thereof. A machine readable signal medium may be any machine readable medium that is not a machine readable storage medium and that can communicate, propagate, or transport a program for use by or in connection with an instruction execution system, apparatus, or device.

Program code embodied on a machine readable medium may be transmitted using any appropriate medium, including but not limited to wireless, wireline, optical fiber cable, RF, etc., or any suitable combination of the foregoing.

Computer program code for carrying out operations for aspects of the disclosure may be written in any combination of one or more programming languages, including an object oriented programming language such as the Java® programming language, C++ or the like; a dynamic programming language such as Python; a scripting language such as Perl programming language or PowerShell script language; and conventional procedural programming languages, such as the "C" programming language or similar programming languages. The program code may execute entirely on a stand-alone machine, may execute in a distributed manner across multiple machines, and may execute on one machine while providing results and or accepting input on another machine.

The program code/instructions may also be stored in a machine readable medium that can direct a machine to function in a particular manner, such that the instructions stored in the machine readable medium produce an article of manufacture including instructions which implement the function/act specified in the flowchart and/or block diagram block or blocks.

While the aspects of the disclosure are described with reference to various implementations and exploitations, it will be understood that these aspects are illustrative and that the scope of the claims is not limited to them. In general, techniques for data storage as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores can vary, and particular operations are illustrated in the context of specific illustrative configurations. Other allocations of functionality are envisioned and may fall within the scope of the disclosure. In general, structures and functionality presented as separate components in the example configurations may be implemented as a combined structure or component. Similarly, structures and, functionality presented, as a single component may be implemented as separate components. These and other variations, modifications, additions, and improvements may fall within the scope of the disclosure.

Use of the phrase "at least one of" preceding a list with the conjunction "and" should not be treated as an exclusive list and should not be construed as a list of categories with one item from each category, unless specifically stated otherwise. A clause that recites "at least one of A, B, and C" can be infringed with only one of the listed items, multiple of the listed items, and one or more of the items in the list and another item not listed.

As used herein, the term "or" is inclusive unless otherwise explicitly noted. Thus, the phrase "at least one of A, B, or C" is satisfied by any element from the set {A, B, C} or any combination thereof, including multiples of any element.

EXAMPLE EMBODIMENTS

Example embodiments include the following:

Embodiment 1 is a method, the method comprising: receiving data to store in a first storage device or second storage device, wherein the first storage device and second storage device are located in a borehole of a geologic formation, and wherein a value of a storage attribute associated with the first storage device is different than a value of a storage attribute associated with the second storage device; determining a value based on an ambient condition downhole in the borehole; and storing the data in the first storage device, if the value based on the ambient condition is less than or equal to a threshold, or storing the data in the second storage device, if the value based on the ambient condition is greater than the threshold. The first storage device and the second storage device as described in Embodiment 1 are non-volatile memory; wherein the value based on the ambient condition is a temperature in the borehole; wherein the storage attribute is memory density; and wherein the value of the storage attribute associated with the first storage device is higher than the value of the storage attribute associated with the second storage device. Any of the preceding embodiments further comprises transferring data in the first storage device into the second storage device when the value based on the ambient condition downhole is greater than the threshold. Storing the data in the second storage device in any of the preceding embodiments comprises compressing or downsampling the data. The value based on the ambient condition in any of the preceding embodiments is a vibration level in the borehole; wherein the first storage device and second storage device are disk drives; wherein the storage attribute is vibration resistance; and wherein the value of the storage attribute associated with the first storage device is lower than the value of the storage attribute associated with the second storage device. The value based on the ambient condition in any of the preceding embodiments is a temperature in the borehole; wherein the storage attribute is power consumption; wherein the first storage device and second storage device are non-volatile memory; and wherein the value of the storage attribute associated with the first storage device is higher than the value of the storage attribute associated with the second storage device. The value based on the ambient condition in any of the preceding embodiments is a temperature in the borehole; wherein the storage attribute is a data transfer rate; wherein the first storage device and second storage device are non-volatile memory; and wherein the value of the storage attribute associated with the first storage device is higher than the value of the storage attribute associated with the second storage device.

Embodiment 2 is a storage system, the storage system comprising: a first storage device; a second storage device; wherein the first storage device and second storage device are located in a borehole of a geologic formation, and wherein a value of a storage attribute associated with the first storage device is different than a value of a storage attribute associated with the second storage device; and program code stored in machine readable media and executable by a processor to perform the functions of: receiving data to store in the first storage device or second storage device; determining a value based on an ambient condition downhole in the borehole; and storing the data in the first storage device, if the value based on the ambient condition is less than or equal to a threshold, or and storing the data in the second storage device, if the value based on the ambient condition is greater than the threshold. The first storage device and the second storage device as described in Embodiment 2 are non-volatile memory; wherein the value based on the ambient condition is a temperature in the borehole; wherein the storage attribute is memory density; and wherein the value of the storage attribute associated with the first storage device is higher than the value of the storage attribute associated with the second storage device. Any of the preceding embodiments of Embodiment 2 further comprises program code to transfer data in the first storage device into the second storage device when the value based on the ambient condition downhole is greater than the threshold. The program code to store the data in the second storage device as described in any of the preceding embodiments of Embodiment 2 comprises program code to compress or downsample the data. The value based on the ambient condition as described in any of the preceding embodiments of Embodiment 2 is a vibration level in the borehole; wherein the storage attribute is vibration resistance; wherein the first storage device and second storage device are disk drives; and wherein the value of the storage attribute associated with the first storage device is lower than the value of the storage attribute associated with the second storage device. The value based on the ambient condition as described in any of the preceding embodiments of Embodiment 2 is a temperature in the borehole; wherein the storage attribute is power consumption; wherein the first storage device and second storage device are non-volatile memory; and wherein the value of the storage attribute associated with the first storage device is lower than the value of the storage attribute associated with the second storage device. The value based on the ambient condition as described in any of the preceding embodiments of Embodiment 2 is a temperature in the borehole; wherein the storage attribute is a data transfer rate; wherein the first storage device and second storage device are non-volatile memory; and wherein the value of the storage attribute associated with the first storage device is higher than the value of the storage attribute associated with the second storage device.

Embodiment 3 is a non-transitory machine-readable media comprising program code executable by a processor to: receive data to store in a first storage device or second storage device, wherein the first storage device and second storage device are located in a borehole of a geologic formation, and wherein a value of a storage attribute associated with the first storage device is different than a value of a storage attribute associated with the second storage device; determine a value based on an ambient condition downhole in the borehole; and store the data in the first storage device, if the value based on the ambient condition is less than or equal to a threshold, or store the data in the second storage device, if the value based on the ambient condition is greater than the threshold. The value based on the ambient condition as described in Embodiment 3 is a temperature in the borehole; wherein the storage attribute is memory density; wherein the first storage device and second storage device are non-volatile memory; and wherein the value of the storage attribute associated with the first storage device is higher than the value of the storage attribute associated with the second storage device. Any of the preceding embodiments of Embodiment 3 further comprises program code to transfer data in the first storage device into the second storage device when the value based on the ambient condition downhole is greater than the threshold. The program code to store the data in the second storage device as described in any of the preceding embodiments of Embodiment 3 comprises program code to compress or downsample the data. The value based on the ambient condition as described in any of the preceding embodiments of Embodiment 3 is a temperature in the borehole; wherein the storage attribute is power consumption; wherein the first storage device and second storage device are non-volatile memory; and wherein the value of the storage attribute associated with the first storage device is lower than the value of the storage attribute associated with the second storage device. The value based on the ambient condition as described in any of the preceding embodiments of Embodiment 3 is a temperature in the borehole; wherein the storage attribute is a data transfer rate; wherein the first storage device and second storage device are non-volatile memory; and wherein the value of the storage attribute associated with the first storage device is higher than the value of the storage attribute associated with the second storage device.

What is claimed is:

1. A method comprising:
   receiving data to store in a first storage device or a second storage device,
      wherein the first storage device and the second storage device are located in a borehole of a geologic formation,
      wherein a first value of a storage attribute associated with the first storage device is different than a second value of the storage attribute associated with the second storage device,
      wherein the first storage device and the second storage device are non-volatile memory composed of cells which store data,
      wherein the cells each comprise a first cell and second cell,
      wherein each of the cells is a transistor in which current flows between two terminals via a channel in a substrate,
      wherein each of the cells is controlled by a floating gate and a control gate,
      wherein the floating gate is interposed between the control gate and the channel,
      wherein there is a first distance between the first cell of the first storage device and second cell of the first storage device,
      wherein there is a second distance between the first cell of the second storage device and second cell of the second storage device, and
      wherein the first distance is less than the second distance;
   determining a third value based on an ambient condition downhole in the borehole; and
   storing the data in the first storage device, if the third value based on the ambient condition is less than or equal to a threshold, or
   storing the data in the second storage device, if the third value based on the ambient condition is greater than the threshold.

2. The method of claim 1, wherein the first storage device and the second storage device are non-volatile memory; wherein the third value based on the ambient condition is a temperature in the borehole; wherein the storage attribute is memory density; and wherein the first value of the storage attribute associated with the first storage device is higher than the second value of the storage attribute associated with the second storage device.

3. The method of claim 1, further comprising transferring data in the first storage device into the second storage device when the third value based on the ambient condition is greater than the threshold.

4. The method of claim 1, wherein storing the data in the second storage device comprises compressing or downsampling the data.

5. The method of claim 1, wherein the third value based on the ambient condition is a vibration level in the borehole; wherein the storage attribute is vibration resistance; and wherein the first value of the storage attribute associated with the first storage device is lower than the second value of the storage attribute associated with the second storage device.

6. A storage system comprising:
   a first storage device;
   a second storage device;
   wherein the first storage device and the second storage device are located in a borehole of a geologic formation, and wherein a value of a storage attribute associated with the first storage device is different than a value of the storage attribute associated with the second storage device; and
   program code stored in machine readable media and executable by a processor to perform functions of:
      receiving data to store in the first storage device or the second storage device;
      determining a value based on an ambient condition downhole in the borehole; and
      storing the data in the first storage device, if the value based on the ambient condition is less than or equal to a threshold, or
      storing the data in the second storage device, if the value based on the ambient condition is greater than the threshold,
   wherein the first storage device and the second storage device are non-volatile memory; wherein the value based on the ambient condition is a temperature in the borehole; wherein the storage attribute is a data transfer rate; and wherein the value of the storage attribute associated with the first storage device is higher than the value of the storage attribute associated with the second storage device.

7. The storage system of claim 6, wherein the program code to store the data in the second storage device comprises program code to compress or downsample the data.

8. The storage system of claim 6 wherein a second storage attribute is power consumption; and wherein the value of the second storage attribute associated with the first storage device is lower than the value of the second storage attribute associated with the second storage device.

9. The storage system of claim 6 wherein a second storage attribute is memory density; and wherein a value of the second storage attribute associated with the first storage device is higher than a value of the second storage attribute associated with the second storage device.

10. The storage system of claim 6, further comprising program code to transfer data in the first storage device into the second storage device when the value based on the ambient condition is greater than the threshold.

11. A method comprising:
    receiving data to store in a first storage device or a second storage device, wherein the first storage device and the second storage device are located in a borehole of a geologic formation, and wherein a value of a storage attribute associated with the first storage device is different than a value of the storage attribute associated with the second storage device, determining a value based on an ambient condition downhole in the borehole; and storing the data in the first storage device, if the value based on the ambient condition is less than or equal to a threshold, or storing the data in the second storage device, if the value based on the ambient condition is greater than the threshold, wherein the first storage device and the second storage device are non-volatile memory; wherein the value based on the ambient condition is a temperature in the borehole; wherein the storage attribute is a data transfer rate; and wherein the value of the storage attribute associated with the first storage device is higher than the value of the storage attribute associated with the second storage device.

12. The method of claim 11 wherein a second storage attribute is power consumption; and wherein a value of the second storage attribute associated with the first storage device is lower than a value of the second storage attribute associated with the second storage device.

13. The method of claim 11, wherein a second storage attribute is memory density; and wherein the value of the second storage attribute associated with the first storage device is higher than the value of the second storage attribute associated with the second storage device.

14. The method of claim 11, further comprising transferring data in the first storage device into the second storage device when the value based on the ambient condition is greater than the threshold.

15. The method of claim 11, wherein storing the data in the second storage device comprises compressing or downsampling the data.

16. A non-transitory machine-readable media comprising program code executable by a processor to:

receive data to store in a first storage device or a second storage device, wherein the first storage device and the second storage device are located in a borehole of a geologic formation, and wherein a value of a storage attribute associated with the first storage device is different than a value of the storage attribute associated with the second storage device;

determine a value based on an ambient condition downhole in the borehole; and store the data in the first storage device, if the value based on the ambient condition is less than or equal to a threshold, or store the data in the second storage device, if the value based on the ambient condition is greater than the threshold, wherein the first storage device and the second storage device are non-volatile memory; wherein the value based on the ambient condition is a temperature in the borehole; wherein the storage attribute is a data transfer rate; and wherein the value of the storage attribute associated with the first storage device is higher than the value of the storage attribute associated with the second storage device.

17. The non-transitory machine-readable media of claim 16, further comprising program code to transfer data in the first storage device into the second storage device when the value based on the ambient condition downhole is greater than the threshold.

18. The non-transitory machine-readable media of claim 16, wherein the program code to store the data in the second storage device comprises program code to compress or downsample the data.

19. The non-transitory machine-readable media of claim 16, wherein a second storage attribute is power consumption; and wherein the value of the second storage attribute associated with the first storage device is lower than the value of the second storage attribute associated with the second storage device.

20. The non-transitory machine-readable media of claim 16, wherein the storage attribute is memory density; and wherein the value of the storage attribute associated with the first storage device is higher than the value of the storage attribute associated with the second storage device.

* * * * *